Dec. 29, 1925.
1,567,214
L. R. VAN TASSEL
ANIMAL TRAP
Filed June 6, 1925
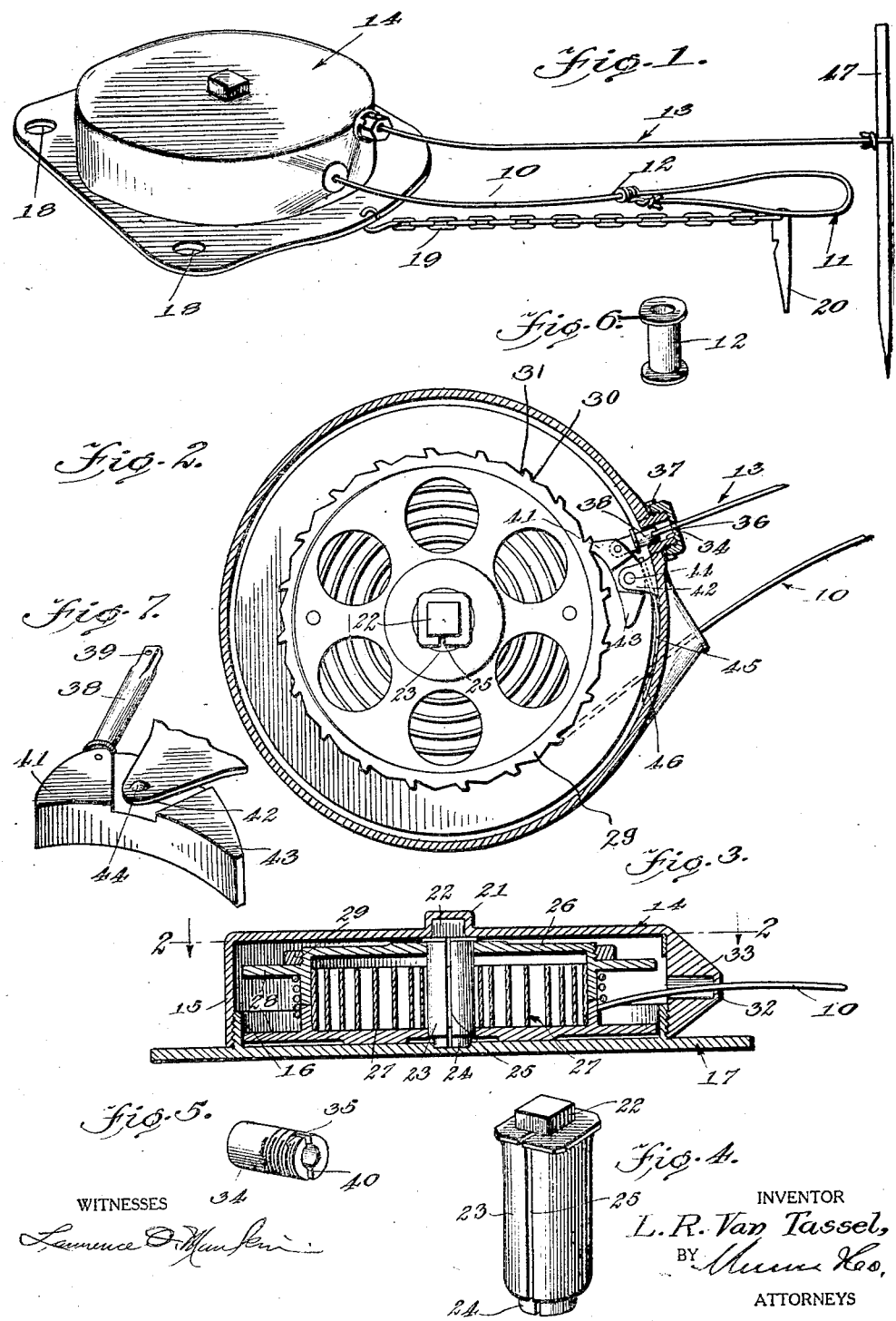
INVENTOR
L. R. Van Tassel,
BY
ATTORNEYS
WITNESSES Patented Dec. 29, 1925.

1,567,214

UNITED STATES PATENT OFFICE.

LOVELL R. VAN TASSEL, OF REYNOLDSVILLE, PENNSYLVANIA.

ANIMAL TRAP.

Application filed June 6, 1925. Serial No. 35,367.

*To all whom it may concern:*

Be it known that I, LOVELL R. VAN TASSEL, a citizen of the United States, and a resident of Reynoldsville, in the county of Jefferson and State of Pennsylvania, have invented certain new and useful Improvements in Animal Traps, of which the following is a specification.

My present invention relates generally to animal traps, and more particularly to that type of trap which must be hand set and in which spring actuated means are employed to draw a snare tight around the animal being caught, the latter being in this way taken alive and being with my improvements so held that the snare cannot be pulled out by a direct pull upon the snare alone.

A primary object of my invention is the provision of a small compact and durable device of this nature which may be set up in a small space, and practically any space in which the ordinary steel jaw trap may be placed, and a further object is the provision of a trap which will be positive and effective in action.

In the accompanying drawing which illustrates my present invention and forms a part of this specification, Figure 1 is a perspective view of the complete trap, Figure 2 is a horizontal sectional view through the casing of the trap taken substantially on the line 2—2 of Figure 3, Figure 3 is a vertical section taken diametrically through the body of the trap, Figure 4 is a detailed perspective view of the spindle, Figure 5 is a detailed perspective view of the outlet tube of the trip line, Figure 6 is a detailed perspective view of a portion of the slip noose of the snare line, and Figure 7 is a detailed perspective view of the drum controlling latch and trip line pin.

Referring now to these figures, my improved trap involves the use of a snare line 10 which is stretched out over the ground and terminates in a slip noose 11, usually concealed in any suitable manner, the line 10 working through an eye 12 around which the terminus of the slip noose 11 is fastened. My improved trap also involves the use of a trip line 13 which is in practice stretched above the ground adjacent to the slip noose 11 so that an animal coming into contact with the trip line 13 as in Figure 1, will strike the latter, at about the time it is partly or wholly within the slip noose 11.

The snare line 10 and trip line 13 enter the cover portion 14 of a shallow cylindrical casing, the cover portion 14 having a down turned flange 15 threaded internally around its free edge to coact with the upstanding externally threaded rib 16 of the casing base 17 which is somewhat greater in diameter than the flanged cover portion 14 and may have openings 18 in order that it may be secured to a suitable support, as well as an extending chain 19 provided with a terminal anchor 20 by means of which the body of the trap may be anchored at any suitable point upon the ground.

The cover portion 14 of the casing has a central boss 21 provided with an inner squared bore or recess to receive the reduced squared upper end 22 of an axial spindle 23 having at its lower end a reduced rounded bearing portion 24 entering a conformable opening or recess in the base plate 17 in order that the spindle may be effectively supported, and at the same time permit the base plate 17 to be turned relative to the cover portion 14 of the casing in the engagement and disengagement of their threaded portions before mentioned.

The spindle 23 which it will be noted from Figure 4 has a lengthwise slot 25, forms a center bearing for a rotating drum 26 which is flanged and in two parts enclosing between them an actuating spring 27, one angular end of which is disposed within the slot 25 of the spindle and the other end of which is secured to the drum. Between the flanges 28, the drum receives the snare line 10, one end of which is securely fastened to the drum in such manner that when the snare line is pulled out in the setting of the trap in place, the spring 27 will be placed under tension. Above its upper flange the drum 26 has attached thereto a toothed ring 29 whose peripheral series of teeth present angular surfaces 30 in one direction which are preferably disposed at obtuse angles and which present angular surfaces 31 in the opposite direction which are preferably acutely angular for reasons which will be presently apparent.

The snare line 10 enters the cover portion 14 of the casing through a guide opening 32 formed through a guide boss 33 of the flange 15, as seen in Figures 2 and 3, but where the trip line 13 enters the casing the flange 15 has an opening in which a guide tube 34 is securely fastened at one end. The externally projecting portion of this guide tube is threaded as at 35 to receive a cap 36 having an axial guide opening for the trip line and preferably held in place by a lock washer 37. The tube 34 forms a guide for a pin 38, to the outer apertured end of which the inner end of the trip line is secured. This pin 38 has an aperture 39 and the trip line may be secured to the pin through the opening 39 for which purpose the outer end of the tube 34 is diametrically slotted as at 40 and shown plainly in Figure 5, the slots forming guides for the end of the line to guide the same through the opening 39.

At its inner end within the cover portion 14 of the casing, the pin 38 is pivotally connected to one side of nose 41 of a double pawl fulcrumed approximately at its center in connection with an inwardly projecting bearing bracket 42 of the casing and having at the opposite side of its fulcrum a second engaging nose 43. The nose 41 of the lever is formed to coact with the obtusely angular surfaces 30 of the teeth of ring 29, while the nose 43 is formed to co-operate with and engage the acutely angular toothed surfaces 31. There is also secured to the pawl at a point opposite to its fulcrum 44 one end of a spring 45 whose opposite end has bearing against the inner surface of the flange 15, and whose last mentioned end is slidably adjustable in connection with a guide pin 46 of the casing. Thus when either end or nose of the pawl is shifted toward the toothed ring 29, it is placed under slight tension permitting the same to yield away from the teeth of the ring in one direction of movement of the latter, and to engage said teeth should the ring tend to move in the opposite direction.

In setting the trap it is first necessary to press the trip line 13 inwardly of the casing to a slight extent in order to shift the pawl to the position shown in Figure 2 with its nose 41 arranged to engage the obtusely angular surfaces 30 of the teeth of the ring. With the pawl in this position it is then simply necessary to pull the snare line 10 outwardly to the desired length when the nose 41 of the pawl will engage one of the toothed surfaces 30 to prevent the drum from turning in the opposite direction under the effect of its spring 27 at this time under tension. The loop 11 is then set to the proper size and concealed, and the trap body anchored at a convenient point nearby. The trip line 13 is then extended across the space slightly above the loop 11 and secured at its free end to any suitable point for instance, a twig or the like, or any small stick, as indicated at 47 in Figure 1. When the animal strikes the trip line 13 and the latter in flexing is thus drawn to some extent away from the casing of the trap, the pin 38 will be pulled outwardly in the tube 34, thus releasing the nose 41 of the pawl from the toothed ring 29 and permitting the spring 27 to respond by rotating the drum 26. By virtue of rotation of the drum the snare line 10 will be drawn inwardly and the animal will be engaged within the slip noose 11 which is of course tightened instantly, by virtue of movement of the snare line through the eye 12. The animal thus engaged will be jerked toward the body of the trap and in the meantime, the pawl having been shifted on its fulcrum 44, its nose 43 will come into engagement with the teeth of the ring 29 and, when the spring has exhausted its tension, the drum will be prevented from reverse movement due to the struggles of the animal away from the trap by virtue of the engagement of the nose 43 of the pawl with the acutely angular surfaces 31 of the teeth. It is obvious at this time that the pawl will be under slight tension of spring 45 whose point of connection with the pawl has then been shifted to the opposite side of the fulcrum point.

It is apparent from the foregoing that my invention provides a trap of the present type well adapted to the carrying out of the objects first above stated, as well as one which on account of its small compact nature, lends itself to ready concealment.

I claim:

1. An animal trap including a casing having anchoring means, a snare line movable through the casing and having a slip noose, a spring actuated drum rotatable within the casing on which the snare line is wound, a trip line extending from the casing, a toothed ring on the drum having oppositely facing angular surfaces presented by the teeth thereof, and a member controlled by the trip line and cooperating with the toothed ring to normally prevent rotation of the drum under tension of its spring and to prevent rotation of the drum in the opposite direction after the tension of its spring has been exhausted.

2. An animal trap including a casing having anchoring means, a snare line movable through the casing and having a slip noose, a spring actuated drum rotatable within the casing on which the snare line is wound, a trip line extending from the casing, a toothed ring on the drum having oppositely facing angular surfaces presented by the teeth thereof, and a double nosed pawl fulcrumed in the casing and shiftable into engagement with the toothed ring and under control of the trip line to prevent rotation of the drum in one direction until the trip line has been actuated and to prevent rotation of the drum in the other direction after the tension of its actuating spring has become exhausted.

3. A trap of the character described, including snare and trip lines, a casing including a flanged cover portion, the flange of which is provided with guide means for the said snare and trip lines, and a base portion threaded in connection with the flange of the cover portion, said cover and base portions having axial bearings, a spindle mounted in said bearings, a drum around which the snare line is wound rotatable on the said spindle, and a spring within the drum connected at one end thereto and at its opposite end to the spindle, a toothed ring carried by the drum and having its teeth presenting oppositely facing angular surfaces, and a double nosed pawl fulcrumed within the casing for engagement with the said teeth and connected to and under control of the trip line.

4. A trap of the character described, including snare and trip lines, a casing including a flanged cover portion, the flange of which is provided with guide means for the said snare and trip lines, and a base portion threaded in connection with the flange of the cover portion, said cover and base portions having axial bearings, a spindle mounted in said bearings, a drum around which the snare line is wound rotatable on the said spindle, and a spring within the drum connected at one end thereto and at its opposite end to the spindle, a toothed ring carried by the drum and having its teeth presenting oppositely facing angular surfaces, and a double nosed pawl fulcrumed within the casing for engagement with the said teeth and connected to and under control of the trip line, said trip line having at its inner end a pin pivotally connected to the pawl and said casing having a tubular guide for the pin provided with a centrally apertured cap externally of the casing whose aperture forms a guide for the trip line.

LOVELL R. VAN TASSEL.